(12) United States Patent
Burkes et al.

(10) Patent No.: US 11,374,503 B2
(45) Date of Patent: Jun. 28, 2022

(54) DC COMPENSATION FOR POWER TRANSFORMER THROUGH NEUTRAL DC INJECTION

(71) Applicant: SAVANNAH RIVER NUCLEAR SOLUTIONS, LLC, Aiken, SC (US)

(72) Inventors: Klaehn W. Burkes, Wagener, GA (US); Vincent J. Ceyssens, Augusta, GA (US); Johan H. R. Enslin, Charleston, SC (US); Moazzam Nazir, Charleston, SC (US)

(73) Assignees: Savannah River Nuclear Solutions, LLC, Aiken, SC (US); Clemson University, Clemson, SC (US)

( * ) Notice: Subject to any disclaimer, the term of this patent is extended or adjusted under 35 U.S.C. 154(b) by 0 days.

(21) Appl. No.: 17/196,152

(22) Filed: Mar. 9, 2021

(65) Prior Publication Data

US 2021/0288593 A1    Sep. 16, 2021

Related U.S. Application Data

(60) Provisional application No. 62/989,004, filed on Mar. 13, 2020.

(51) Int. Cl.
*H02M 7/487* (2007.01)
*H02M 7/5387* (2007.01)
*H02M 7/537* (2006.01)

(52) U.S. Cl.
CPC .................................. *H02M 7/537* (2013.01)

(58) Field of Classification Search
CPC ........................................................ H02M 7/537
See application file for complete search history.

(56) References Cited

U.S. PATENT DOCUMENTS 6,034,855 A     3/2000 Bishop
6,242,895 B1 *  6/2001 Fujii ........................ G05F 1/70
                                                323/207

(Continued)

OTHER PUBLICATIONS

Bilodeau, et al. "Overview of a Special Publication on Voltage Sourced Converter Application in Power Transmission" *IEEE Pow. Eng. Soc. Gen. Mtg.* (2007) pp. 1-8.

(Continued)

*Primary Examiner* — Jared Fureman
*Assistant Examiner* — Esayas G Yeshaw
(74) *Attorney, Agent, or Firm* — Dority & Manning, P.A.

(57) ABSTRACT

A power transmission system can include a transformer and compensator circuit(s), each coupled between a node of the transformer and a ground connection. The compensator circuit(s) can each be configured to counteract a DC signal component of an AC signal at the transformer. The compensator circuit(s) can include a converter circuit having an AC side and a DC side and configured to convert a DC voltage on the DC side to an AC signal at the AC side. The compensator circuit(s) can include a DC link coupled to the DC side of the converter circuit. The compensator circuit(s) can include a controller configured to measure a DC signal component between the load and the ground; to determine, based at least in part on the DC signal component, a compensating signal configured to counteract the DC signal component; and to inject, by the converter circuit, the compensating signal to counteract the DC signal component.

20 Claims, 13 Drawing Sheets

(56) References Cited

U.S. PATENT DOCUMENTS

| | | | |
|---|---|---|---|
| 6,636,107 | B2 | 10/2003 | Pelly |
| 8,035,935 | B2 | 10/2011 | Ramirez et al. |
| 8,300,378 | B2 | 10/2012 | Birnbach |
| 8,537,508 | B2 | 9/2013 | Faxvog et al. |
| 8,681,467 | B2 | 3/2014 | Chu et al. |
| 8,878,396 | B2 | 11/2014 | Faxvog et al. |
| 9,018,962 | B2 | 4/2015 | Hoffman et al. |
| 9,396,866 | B2 | 7/2016 | Ramirez |
| 9,562,938 | B2 | 2/2017 | Cox |
| 10,297,383 | B2 | 5/2019 | Hamberger |
| 2014/0008119 | A1 | 1/2014 | Brandt |
| 2015/0055387 | A1* | 2/2015 | Tengner ............ H02M 1/15 363/132 |
| 2016/0079859 | A1* | 3/2016 | Barbosa ............ H02M 1/4208 363/15 |
| 2016/0359424 | A1* | 12/2016 | Tran ............ H02M 1/32 |
| 2018/0054140 | A1* | 2/2018 | Chen ............ H02M 7/797 |
| 2018/0205217 | A1 | 7/2018 | Fuchs et al. |
| 2019/0058395 | A1* | 2/2019 | Tayebi ............ H02M 7/44 |
| 2019/0214814 | A1 | 7/2019 | Carty et al. |
| 2020/0280267 | A1* | 9/2020 | Restrepo ............ H02M 1/44 |
| 2020/0321880 | A1* | 10/2020 | Lee ............ H02M 3/00 |
| 2021/0098989 | A1* | 4/2021 | Niemann ............ H02J 3/1842 |

OTHER PUBLICATIONS

Bolduc, L. "GIC observations and studies in the Hydro-Quebec power system" *J. Atmosph. Solar-Terr. Phys.* 64 (2002) pp. 1793-1802.

Crockett, C. "What are coronal mass ejections?" *EarthSky.org* (2019) pp. 1-4.

Divan, et al. "Modular controllable transformers (MCT)" *GA Tech. Res. Inst.* DE-OE0000855 (2018) pp. 1-149.

EPRI. "Monitoring and mitigation of geomagnetically induced currents" EPRI Report No. 1015938 (2008).

Gaunt, et al. "Transformer failures in regions incorrectly considered to have low GIC risk" *Proc. IEEE Lausanne Pow. Tech.* 445 (2007) pp. 807-812.

Girgis, et al. "Effects of GIC on power transformers and power systems" *PES T&D* (2012) pp. 1-8.

Gish, et al. "Rotor heating effects from geomagnetic induced current" *IEEE Trans. Pow. Del.* 9 (1994) pp. 712-719.

Guillon, et al. "A colorful blackout: The havoc caused by auroral electrojet generated magnetic field variations in 1989" *IEEE Pow. Ener. Mag.* 14 (2016) pp. 59-71.

Gurevich, V. "Protection of Power Transformers Against Geomagnetically Induced Currents" *Serb. J. Elec. Eng.* 8 (2011) pp. 333-339.

Gyugyi, L. "Control of shunt compensation with reference to new design concepts" *IEE Proc. C* 128 (1981) pp. 374-381.

Horn, et al. "Evaluation of active power filter control algorithms under non-sinusoidal and unbalanced conditions" *Proc. 7th Int'l Conf. Harm. Qual. Pow.* (1996) pp. 217-224.

Hussein, et al. "Fuzzy logic controlled variable resistor for suppressing GIC in transformers" *IET Gen. Transm. Distrib.* 11 (2017) pp. 1494-1501.

Hussein, A.A. "Mitigation of geomagnetically induced currents by variable series reactor" *Proc. N. Amer. Pow. Symp.* (2017) pp. 1-6.

Kappenman, J. "Low-frequency protection concepts for the electric power grid: Geomagnetically induced current (GIC) and E3 HEMP mitigation" *Metatech Corp.* Meta-R-322 (2010) pp. 1-94.

Kappenman, J. "Geomagnetic storms and their impacts on the U.S. Power Grid" *Metatech Corp.* Meta-R-319 (2010) pp. 1-197.

Lahtinen, et al. "GIC Occurrences and GIC Test for 400 kV System Transformer" *IEEE Trans. Power Del.* 17 (2002) pp. 555-561.

Lordan, R. "Geomagnetic disturbance (GMD) neutral blocking device analysis" EPRI Report (2014).

Mangaraj, et al. "Neural network control technique based sensorless DSTATCOM for the power con&Wonmy" *Annual IEEE India Conf.* (2015) pp. 1-6.

Mattei, et al. "Response of Power System Protective Relays to Solar and Hemp MHD-E3 GIC" *Tex. AM Conf. Prot. Relay Eng.* (2019) pp. 1-28.

Nerc. "Geo-magnetic Disturbances (GMD): Monitoring, Mitigation, and Next Steps" *N. Am. Elec. Reliab. Corp.* (2011) pp. 1-84.

Pirjola, et al. "Geomagnetically induced currents in European high-voltage power systems" *Proc. Can. Conf. Elect. Comput. Eng.* (2006) pp. 1263-1266.

Pulkkinen, et al. "Geomagnetic storm of Oct. 29-31, 2003: Geomagnetically induced currents and their relation to problems in the Swedish high-voltage power transmission system" *Space Weather* S08C03 (2005) pp. 1-19.

Rajapakse, et al. "Power grid stability protection against GIC using a capacitive grounding circuit" *Proc. PES T&D* (2012) pp. 1-6.

Salam, et al. "Harmonics mitigation using active power filter: A technological review" *Elek. J. Elect. Eng.* 8 (2006) pp. 17-26.

Salmeron, et al. "Improvement of the electric power quality using series active and shunt passive filters" *IEEE Trans. Power Del.* 25 (2010) pp. 1058-1067.

Singh, et al. "A Comparison of Control Algorithms for DSTATCOM" *IEEE Trans. Ind. Electron.* 56 (2009) pp. 2738-2745.

Visser, et al. "Transformerless series sag compensation with a cascaded multilevel inverter" *IEEE Trans. Ind. Electron.* 49 (2002) pp. 824-831.

Widrow, et al. "Layered neural nets for pattern recognition" *IEEE Trans. Acoust.* 36 (1988) pp. 1109-1118.

Wikipedia. "Geomagnetic storm" *Wikipedia* (2019) pp. 1-11.

\* cited by examiner

DC COMPENSATION FOR POWER TRANSFORMER THROUGH NEUTRAL DC INJECTION

CROSS REFERENCE TO RELATED APPLICATIONS

The present application claims filing benefit of U.S. Provisional Patent Application Ser. No. 62/989,004, having a filing date of Mar. 13, 2020, which is incorporated herein by reference in its entirety.

FEDERAL RESEARCH STATEMENT

This invention was made with Government support under Contract No. DE-AC09-085R22470, awarded by the U.S. Department of Energy. The Government has certain rights in the invention.

FIELD

The present subject matter relates generally to power systems, and more particularly, to systems and methods for mitigating DC signals induced by and/or along power transmission equipment.

BACKGROUND

Power transmission equipment, such as power transmission lines and/or transformers, can serve to transmit electrical power in the form of alternating current (AC) over vast distances. For instance, power lines can include lengths of metal wires and transformers that can be configured to transmit and/or scale electrical power signals on the power lines for useful applications. These metal wires and/or transformers can, in some cases, act as antennas that interact with undesirable electrical fields, such as those created by geomagnetic factors. As one example, the power lines can be receptive to energy created by a high-altitude electromagnetic pulse (HEMP), which can result in the HEMP negatively affecting functioning of the power transmission equipment. As one example, signals can be induced in the power lines which can reduce efficiency of and/or damage the power transmission equipment. Additionally and/or alternatively, other factors, such as malfunctions in the power transmission equipment, can negatively affect functioning of the power transmission equipment. For example, undesirable signals from generation equipment can be induced in the power transmission lines, which can serve to reduce efficiency of the equipment and/or damage the equipment.

BRIEF DESCRIPTION

Aspects and advantages of embodiments of the present disclosure will be set forth in part in the following description, or may be learned from the description, or may be learned through practice of the embodiments.

One example aspect of the present disclosure is directed to a compensator circuit coupled between a load and ground and configured to counteract a DC signal component of an AC signal at the load. The compensator circuit can include one or more cells. Each of the one or more cells can include a converter circuit including one or more switching elements, an AC side and a DC side, and configured to convert a DC voltage on the DC side to an AC signal at the AC side. Each of the one or more cells can include a DC link including at least a capacitor coupled to the DC side of the converter circuit, wherein the DC voltage is defined across the DC link. The compensator circuit can include a controller configured to perform operations. The operations can include measuring a DC signal component between the load and ground. The operations can include determining, based at least in part on the DC signal component, a compensating signal configured to counteract the DC signal component. The operations can include injecting, by the converter circuit, the compensating signal to counteract the DC signal component.

Another example aspect of the present disclosure is directed to a power transmission system. The power transmission system can include a power transmission line coupled to a transformer and a system load. The power transmission system can include one or more compensator circuits, each coupled between a node of the transformer and a ground connection. The one or more compensator circuits can each be configured to counteract a DC signal component of an AC signal at the transformer. Each of the one or more compensator circuits can include one or more cells. Each of the one or more cells can include a converter circuit including one or more switching elements, an AC side, and a DC side, and configured to convert a DC voltage on the DC side to an AC signal at the AC side. Each of the one or more cells can include a DC link including at least a capacitor coupled to the DC side of the converter circuit, wherein the DC voltage is defined across the DC link. Each of the one or more compensator circuits can include a controller configured to perform operations. The operations can include measuring a DC signal component between the load and ground. The operations can include determining, based at least in part on the DC signal component, a compensating signal configured to counteract the DC signal component. The operations can include injecting, by the converter circuit, the compensating signal to counteract the DC signal component.

Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
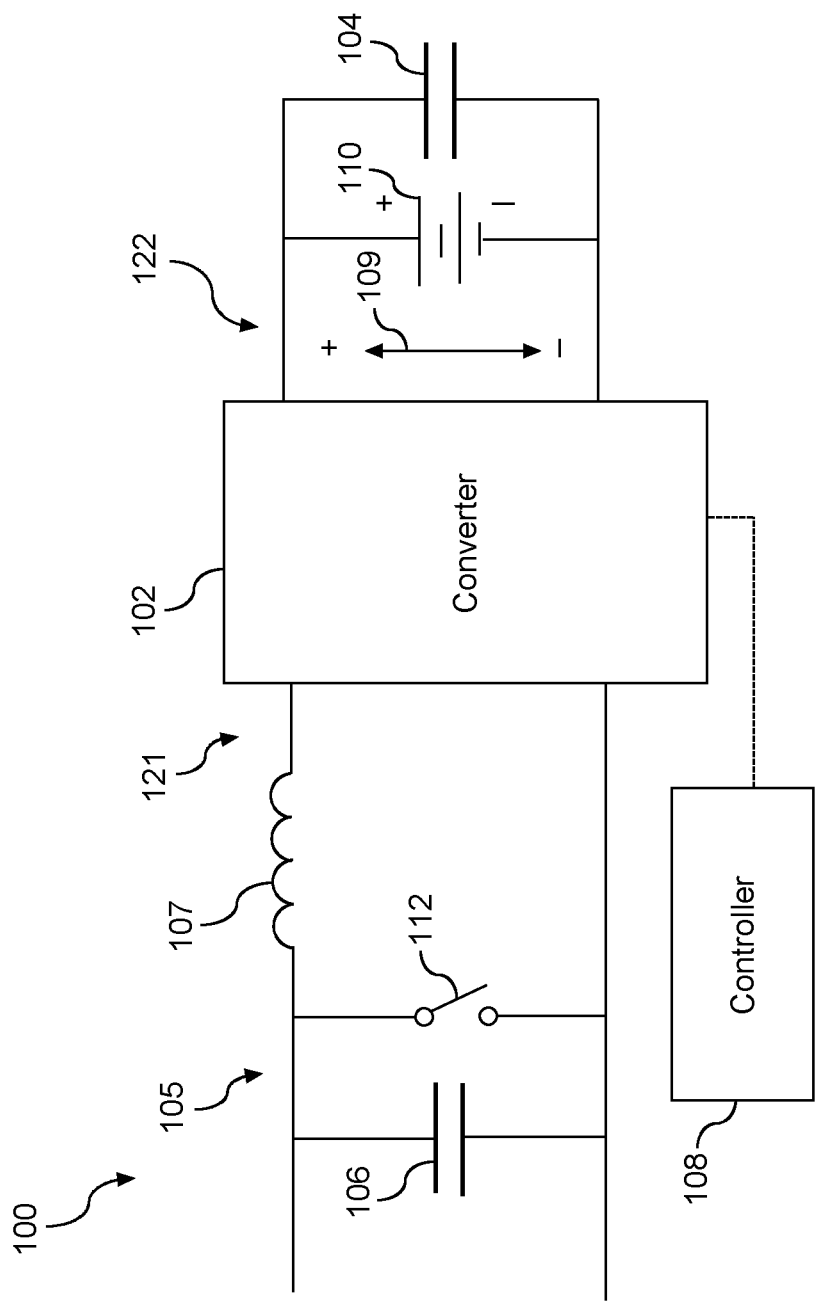
FIG. 1 depicts an example compensator circuit according to example aspects of the present disclosure.

Reference will now be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Example aspects of the present disclosure are directed to a compensator circuit for electrical systems, such as power transmission systems (e.g., three-phase power transmission systems). Generally, the compensator circuit can be coupled to a compensator circuit load in an electrical system and configured to measure a direct current (DC) signal, such as a DC component of an alternating current (AC) signal associated with the compensator circuit load, and inject a compensating signal into the electrical system to at least partially counteract the measured DC signal. For instance, the compensator circuit can be installed at a neutral of a transformer in a power transmission system such that the compensator circuit is connected between the neutral and a ground connection. The compensator circuit can measure a DC signal between the neutral and the ground connection, such as a DC current flowing between the neutral and the ground connection. The compensator circuit can inject a counteracting signal, such as an AC voltage, at the neutral (e.g., between the neutral and ground) to counteract the measured DC signal at the neutral. As another example, the compensator circuit can be installed in shunt with a transformer winding to counteract DC signals at the transformer winding. The compensator circuit can thus provide persistent grid support functions, such as, for example, voltage balancing, harmonic isolation, and/or voltage regulation. Additionally, the compensator circuit can correct for geomagnetically-induced currents (GICs) in the power transmission system resulting from geomagnetic events, such as, for example, geomagnetic disturbances (GMDs) and/or high-altitude nuclear electromagnetic pulses (HEMPs). For example, the compensator circuit can correct for GICs induced as a result of an E3 (e.g., MHD-E3) late-time portion of a HEMP.

According to example aspects of the present disclosure, a compensator circuit can include a converter circuit. The converter circuit can include a DC side and an AC side. The converter circuit can be configured to convert (e.g., invert) a DC signal at the DC side, such as a DC voltage, into an AC signal at the AC side, such as an AC voltage. More particularly, the converter circuit can be configured to convert a DC voltage at the DC side (e.g., a DC link) into a compensating signal. For instance, in some embodiments, a DC link capacitor can be coupled to the DC side to provide power for the converter circuit. Additionally, in some embodiments, a battery, such as a DC battery, can be coupled to the DC side to provide power for the converter circuit. In some embodiments, the converter circuit can be a single-phase converter. For instance, a single-phase converter can be configured to operate on single-phase AC signals.

In some embodiments, the converter circuit can include one or more switching devices. For instance, the switching device(s) can be controlled (e.g., by a controller) such that the DC signal is converted into the AC signal. As one example, the switching device(s) can be modulated over time (e.g., by the controller) to produce an AC signal based on the DC signal.

In some embodiments, the switching device(s) can include one or more transistors. For example, in some embodiments, the transistor(s) can be silicon (Si) transistors. As another example, in some embodiments, the transistor(s) can be silicon carbide (SiC) transistors. The transistor(s) can be or can include any suitable classification of transistor, such as, for example, bipolar junction transistors (BJTs) such as npn BJTs and/or pnp BJTs, field effect transistors such as junction field effect transistors (JFETs), metal oxide semiconductor field effect transistors (MOSFETs), Darlington transistors, insulated-gate bipolar transistors (IGBTs), and/or any other suitable type of transistor, and/or combination thereof. For instance, in one example embodiment, the switching device(s) include silicon MOSFETs and/or silicon carbide MOSFETs.

In some embodiments, the switching device(s) can be arranged in a bridge configuration, such as an H-bridge configuration. For example, an emitter or drain terminal of a first transistor can be coupled by a first coupling to a collector or source of a second transistor. Similarly, an emitter or drain terminal of a third transistor can be coupled by a second coupling to a collector or drain of a fourth transistor. A compensator circuit load (e.g., an AC compensator circuit load on the AC side) can be coupled between the first coupling and the second coupling. For example, in some embodiments, a ground connection is coupled to the first coupling and a transformer neutral is coupled to the second coupling. In some embodiments, a filter capacitor is coupled between the first coupling and the second coupling. The collectors or sources of the first and third transistors can be coupled to the emitters or drains of the second and fourth transistors by a DC bus (e.g., on the DC side) coupled to one or more DC components, such as a DC link capacitor, and defining a DC voltage between the first and third transistors and the second and fourth transistors. The bases or gates of the transistors can be coupled to a controller to operatively enable and/or disable the transistors. In some embodiments, a diode can be coupled between the emitter and collector, or drain and source, of at least one of the transistors.

In some embodiments, the compensator circuit can include a filter (e.g., a low pass filter) coupled to the converter circuit. For example, the filter can be coupled between the compensator circuit load and the converter circuit. The filter can be configured to reduce and/or eliminate switching harmonics from the converter circuit. For example, operation of switching device(s) in the converter circuit to produce the compensating signal can additionally produce unwanted harmonics associated with the compensating signal. The filter (e.g., the low pass filter) can be configured to filter out the harmonics while allowing the fundamental of the compensating signal.

In some embodiments, the filter can be a low pass filter having a low pass filter inductor and/or a low pass filter capacitor. For example, a low pass filter can have significantly higher attenuation for frequencies greater than that of the compensating signal than at a frequency of the compensating signal. Additionally, the low pass filter can have a low attenuation at the frequency of the compensating signal. The inductor can be coupled to one input of the converter. For example, the inductor can be coupled between one of the first coupling or the second coupling and a transformer neutral. The capacitor can be coupled in parallel with the converter. For example, the capacitor can be coupled between the first coupling and the second coupling.

In some embodiments, a bypass switch can be coupled to the compensator circuit. The bypass switch can be configured to selectively bypass (e.g., short) the compensator circuit. For example, the bypass switch can be closed (e.g., by a controller) during a fault event (e.g., a ground fault, inrush current, etc.) to direct current primarily through the bypass switch by inducing a voltage of zero across the converter circuit. This can be useful, for example, to prevent damage to the compensator circuit in the event of an overvoltage and/or overcurrent condition, such as a ground fault. In some embodiments, the bypass switch can be coupled in parallel with the converter circuit and/or the low pass filter capacitor. For example, the bypass switch can be coupled between the first coupling and the second coupling of an H-bridge configuration.

According to example aspects of the present disclosure, a compensator circuit can include a controller. For instance, the controller can be part of a system (e.g., a power transmission system) to which the compensator circuit is coupled. Additionally and/or alternatively, the controller can be included in the compensator circuit (e.g., as a standalone controller). The controller can be configured to perform various operations related to operation of the compensator circuit.

As one example, the controller can be configured to measure a DC signal. For instance, the controller can measure a DC signal component of a signal, such as an AC signal, between a compensator circuit load (e.g., an AC compensator circuit load, such as a transformer neutral) and ground (e.g., a ground connection coupled to earth ground). As one example, the controller can include control circuitry configured to measure a signal (e.g., a voltage) across a compensator circuit load (e.g., a primary side of a transformer) and ground. Additionally and/or alternatively, the controller can include control circuitry configured to measure a signal (e.g., a voltage) between the compensator circuit (e.g., at a terminal connected to the compensator circuit load) and ground.

Additionally and/or alternatively, the controller can control the converter to produce a digital and/or analog signal. For example, the controller can modulate switching elements in the converter to produce an AC signal based on a DC signal and/or produce a DC signal based on an AC signal.

As another example, the controller can be configured to adjust a DC voltage at the DC link capacitor. For instance, the controller can adjust the voltage based on the measured DC signal component. As one example, the controller can compare (e.g., subtract) the DC voltage at the DC link capacitor to a reference DC voltage to determine a DC error. Additionally and/or alternatively, the controller can compare (e.g., subtract) the voltage across the compensator circuit load (e.g., transformer) to a reference compensator circuit load voltage to determine a load error. From the DC error and/or the load error, the controller can determine a compensator circuit reference. The measured DC signal component (e.g., voltage across the compensator circuit) can be compared to the compensator circuit reference to determine the DC voltage at the DC link capacitor (e.g., a delta to adjust the DC voltage and/or the DC voltage itself). For instance, in some embodiments, the controller can determine switching signals (e.g., PWM signals) for switching element (s) in the converter circuit based on the DC voltage.

In some embodiments, the compensator circuit can include one or more cells. For example, each of the cell(s) can include a converter circuit, a DC link capacitor, low pass filter, and/or bypass switch. In some embodiments, a single bypass switch can be configured to bypass more than one cell. In some embodiments, the one or more cells can be coupled in series. For instance, a first cell can be coupled between a compensator circuit load and a second cell, and the second cell can be coupled between the first cell and ground. In some embodiments, a first converter can be used for a first cell and a second converter can be used for a second cell. For example, the first converter and the second converter can have a different configuration of switching elements and/or different switching element composition. For example, in one embodiment, a first converter can include silicon FETs and a second converter can include silicon carbide FETs.

In some embodiments, a compensator circuit according to example aspects of the present disclosure can be configured to operate within a power transmission system. For example, a power transmission system can include one or more power lines configured to deliver power, typically from a source (e.g., a generation system) to a line load (e.g., a building, utility, vehicle, electrical appliance or device, etc.). The power lines can generally be made of conductive material, such as metal wires. The power transmission system can include one or more transformers. For example, the transformer(s) can be configured to step voltages on the power lines, isolate components of the power system from the power lines, or other various functions. As one example, transformers can be employed to transform power from a power generator to a form suitable for transmission along a power line, such as a high-voltage transmission line. As another example, transformers can be employed at substations to scale (e.g., step down) the power received at the substations.

As discussed above, components of the power system, and especially the power lines and/or transformer, can be susceptible to geomagnetically-induced currents. Furthermore, components of the power system can be susceptible to other grid events, such as voltage imbalance, phase imbalance, voltage sag, or other grid events. According to example aspects of the present disclosure, the power system can include one or more compensator circuits to correct for at least these susceptibilities. For example, the compensator circuits can inject compensating signals into the power system to correct for a DC signal component in AC signal(s) in the power system.

A power system can include one or more transformers. The transformer(s) can be and/or include any suitable type of transformer, such as, for example, wye-wye transformers, delta-wye transformers, delta-delta transformers, single-phase autotransformers, two-winding transformers (e.g., single-phase transformers), three-phase transformers, three-phase autotransformers, and/or any other suitable transformer, and/or combination thereof. The transformer(s) can include one or more wye-connected sides, also referred to as star-connected sides. For example, a wye-connected side can include a branch for each phase of the transformer and each branch can be connected to a common point, or neutral. Additionally and/or alternatively, the transformer(s) can include one or more delta-connected sides. For example, a delta connected side can include a node for each phase of the transformer, where each node is coupled to exactly two other nodes. The transformer(s) can include a primary side and/or a secondary side. For example, in some embodiments, a primary side can be at a higher voltage than the secondary side. In some embodiments, the primary side and the secondary side can have different connection configurations. For example, in some embodiments, the primary side can be wye-connected, and the secondary side can be delta-connected. In some embodiments, the transformer(s) can be coupled to ground by a ground connection. For example, the neutral of a wye-connected side can be coupled to ground.

According to example aspects of the present disclosure, a power system can include one or more compensator circuits. For example, in some embodiments, the compensator circuit(s) can be coupled between a neutral of a wye-connected transformer side and ground. As another example, the compensator circuit(s) can be coupled in shunt with a transformer winding (e.g., between a point on a transmission line coupled to the winding and ground). For example, the compensator circuit(s) can be coupled in shunt with a transformer winding on a delta-connected side.

The compensator circuit(s) can be configured to measure at least one DC signal component of the power system. For example, the compensator circuit(s) can be configured to measure a DC voltage between the point which the compensator circuit(s) are connected to (e.g., the neutral of a wye-connected side and/or a terminal of a transformer) and ground. The compensator circuit(s) can inject a compensating signal to counteract the DC signal. For example, the compensator circuits can inject a compensating signal such that the DC signal component, such as a DC signal defined across transformer windings, is reduced, and/or eliminated.

Example aspects of the present disclosure can provide for a number of technical effects and benefits. As one example, systems and methods in the field of power transmission according to example aspects of the present disclosure can achieve a number of improvements over existing solutions. For example, systems and methods according to example aspects of the present disclosure can be employed on a number of distinct transformer types, including, for example, wye-wye transformers, delta-wye transformers, single-phase autotransformers, two-winding transformers, three-phase autotransformers, or any other suitable transformer. This allows for systems and methods according to example aspects of the present disclosure to easily be fitted to existing power networks.

Additionally, systems and methods according to example aspects of the present disclosure can have a reduced cost with respect to existing solutions. For example, series compensation solutions can require installation along a length of a transmission line, which can be expensive over long distances of transmission lines. Additionally, series compensation solutions can contribute to undesirable resonance at the transmission lines. The compensator circuits as described herein, however, can be installed at transformers to cover a section of transmission lines, which can be more cost-effective while also avoiding difficulties associated with series compensation solutions.

Additionally, systems and methods according to example aspects of the present disclosure can have an improved performance of DC compensation compared to existing solutions. For example, some existing solutions, such as series compensation and/or neutral blocking capacitors, can have an effectiveness of about 10% to about 25% in eliminating an undesired DC component. Compensator circuits as discussed herein, however, can almost entirely eliminate a DC signal component of an AC signal, such as a DC signal component defined across transformer windings, after about one cycle of the AC signal. Furthermore, systems and methods as described herein can avoid problems associated with removing a neutral to ground connection of a transformer, which can pose safety risks associated with system protection (e.g., phase imbalance, overvoltage, etc.). Additionally, systems and methods as described herein can avoid difficulties associated with neutral blocking capacitors, such as, for example, transformer impedance changes and/or ferroresonance.

Furthermore, many existing solutions are configured and/or activated only to mitigate geomagnetic events (e.g., GMDs, HEMPs). For instance, many existing solutions either have no effect on a power distribution system in the absence of GIC and/or impact a function of the power distribution system during a geomagnetic event with the intent of protecting the power distribution system. The compensator circuit as described herein, however, is capable of providing grid support functions such as, for example, voltage balance, harmonic isolation, and/or voltage regulation for other grid events, such as DC voltages induced by inverter-based generation, in addition to passively mitigating GIC during a geomagnetic event as a consequence of the grid support functions. This can allow for systems and methods according to example aspects of the present disclosure to provide an efficient solution for grid support functions that does not require installation of an additional system for GIC mitigation. Furthermore, in some embodiments, the compensator can be a transformerless compensator such that the compensator circuit does not include any transformer components, which can reduce a vulnerability of the compensator circuit to geomagnetic events.

With reference now to the figures, example aspects of the present disclosure will be discussed in greater detail. FIG. 1 depicts an example compensator circuit 100 according to example aspects of the present disclosure. Compensator circuit 100 can include converter 102 (e.g., an analog to digital converter and/or a digital to analog converter, such as an inverter). For example, converter 102 can convert a DC signal (e.g., DC link voltage 109) at DC side 122 to an AC signal at AC side 121. Additionally and/or alternatively, converter 102 can convert an AC signal at AC side 121 to a DC signal at DC side 122. For instance, power to convert a DC signal at DC side 122 can be provided by DC link capacitor 104 and/or battery 110. In some embodiments, converter 102 can include one or more switching devices. For instance, the switching device(s) can be controlled (e.g., by controller 108) such that the DC signal at DC side 122 is converted into the AC signal at AC side 121. As one example, the switching device(s) can be modulated over time (e.g., by the controller 108) to produce an AC signal based on the DC signal.

In some embodiments, the switching device(s) can include one or more transistors. For example, in some embodiments, the transistor(s) can be silicon (Si) transistors. As another example, in some embodiments, the transistor(s) can be silicon carbide (SiC) transistors. The transistor(s) can be or can include any suitable classification of transistor, such as, for example, bipolar junction transistors (BJTs) such as npn BJTs and/or pnp BJTs, field effect transistors such as junction field effect transistors (JFETs), metal oxide semiconductor field effect transistors (MOSFETs), Darlington transistors, insulated-gate bipolar transistors (IGBTs), and/or any other suitable type of transistor, and/or combination thereof. For instance, in one example embodiment, the switching device(s) include silicon MOSFETs and/or silicon carbide MOSFETs.

Figure 2:
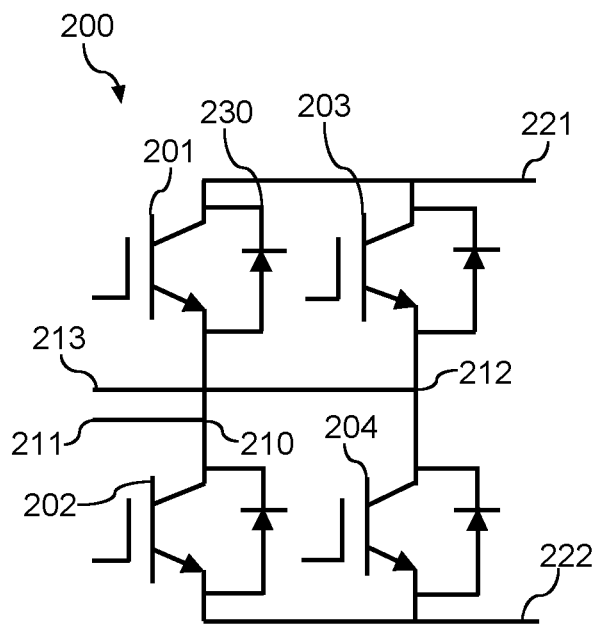
FIG. 2 depicts an example H bridge configuration according to example aspects of the present disclosure.

In some embodiments, the switching device(s) can be arranged in a bridge configuration, such as an H-bridge configuration. An example H-bridge configuration 200 that may be included in converter 102 is depicted in FIG. 2. For example, an emitter or drain terminal of first transistor 201 can be coupled by first coupling 210 to a collector or source of second transistor 202. Similarly, an emitter or drain terminal of third transistor 203 can be coupled by second coupling 212 to a collector or drain of fourth transistor 204. A compensator circuit load can be coupled between the first coupling 210, such as at first AC terminal 211, and the second coupling 212, such as at second AC terminal 213. For example, in some embodiments, a ground connection can be coupled to the first coupling 210 and a transformer neutral is coupled to the second coupling 212. In some embodiments, filter capacitor 106 (FIG. 1) can be coupled between the first coupling 210 and the second coupling 212. For example, filter capacitor 106 (FIG. 1) can be coupled to first AC terminal 211 and/or second AC terminal 213. The collectors or sources of the first and third transistors 201, 203 can be coupled to first DC terminal 221. Similarly, the emitters or drains of the second and fourth transistors 202, 204 can be coupled to second DC terminal 222. One or more DC components, such as DC link capacitor 104 (FIG. 1) can be coupled between first DC terminal 221 and second DC terminal 222 and define DC voltage 109 (FIG. 1) between the first and third transistors 201, 203 and the second and fourth transistors 202, 204. The bases or gates of the transistors 201, 202, 203, 204 can be coupled to a controller (e.g., controller 108 of FIG. 1) to operatively enable and/or disable the transistors 201, 202, 203, 204. For example, the controller 108 can adjust voltages across the bases or gates of the transistors 201, 202, 203, 204 to adjust an operating mode of the transistors 201, 202, 203, 204. In some embodiments, diodes 230 can be coupled between the emitter and collector, or drain and source, of at least one of the transistors 201, 202, 203, 204.

Referring back to FIG. 1, in some embodiments, AC side 121 of converter 102 can be coupled to filter 105. For example, filter 105 can be coupled between a load of the compensator circuit 100 and ground. The filter 105 can be configured to reduce and/or eliminate switching harmonics from the converter 102 (e.g., from switching devices of converter 102). The filter 105 can be configured to filter out the switching harmonics while allowing the fundamental of the AC signal (e.g., the compensating signal) on AC side 121.

In some embodiments, the filter 105 can be a low pass filter having a low pass filter inductor 107 and/or a low pass filter capacitor 106. For example, low pass filter 105 can have significantly higher attenuation for frequencies greater than that of a compensating signal (e.g., provided by converter 102) than at a frequency of the compensating signal. Additionally, low pass filter 105 can have a low attenuation at the frequency of the compensating signal. The inductor 107 can be coupled to one input of the converter 102. For example, the inductor can be coupled between one of the first coupling 210 (FIG. 2) or the second coupling 212 (FIG. 2) and a transformer neutral. For example, capacitor 106 (FIG. 1) can be coupled between at least one of first AC terminal 211 (FIG. 2) and/or second AC terminal 213 (FIG. 2) and a transformer neutral. The capacitor 106 can be coupled in parallel with the converter 102. For example, the capacitor 106 can be coupled between the first coupling 210 (FIG. 2) and the second coupling 212 (FIG. 2). For example, capacitor 106 can be coupled to first AC terminal 211 (FIG. 2) and/or second AC terminal 213 (FIG. 2).

In some embodiments, bypass switch 112 can be coupled to converter 102. The bypass switch 112 can be configured to selectively bypass (e.g., short) the converter and/or other components of compensator circuit 100, such as, for example, filter 105. For example, the bypass switch 112 can be closed (e.g., by controller 108) during a fault event (e.g., a ground fault, inrush current, etc.) to direct current primarily through the bypass switch 112 by inducing a voltage of zero across the converter 102. This can be useful, for example, to prevent damage to the compensator circuit 100 in the event of a severe fault. In some embodiments, the bypass switch 112 can be coupled in parallel with the converter 102 and/or the low pass filter capacitor 106. For example, the bypass switch 112 can be coupled between the first coupling 210 and the second coupling 212 of FIG. 2.

Figure 7:
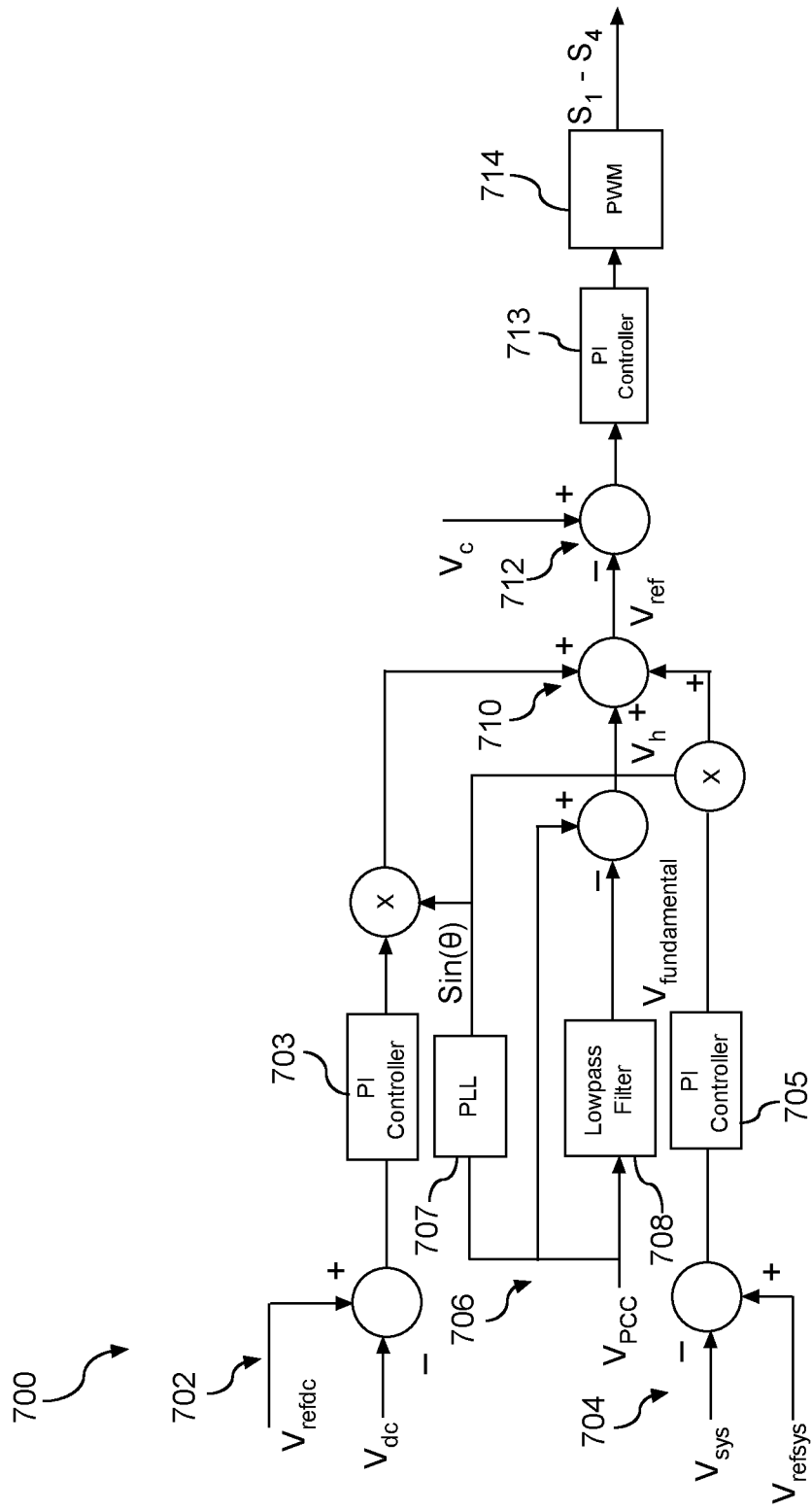
FIG. 7 depicts an example block diagram of a controller for a compensator circuit according to example aspects of the present disclosure.

Compensator circuit 100 can include controller 108. An example configuration of controller 108 is depicted in FIG. 7. For example, controller 108 can be configured to control converter 102 and/or bypass switch 112. Additionally and/or alternatively, controller 108 can be configured to adjust DC link voltage 109. Controller 108 can also be configured to obtain signal measurements at various points in systems coupled to compensator 100.

Figure 3:
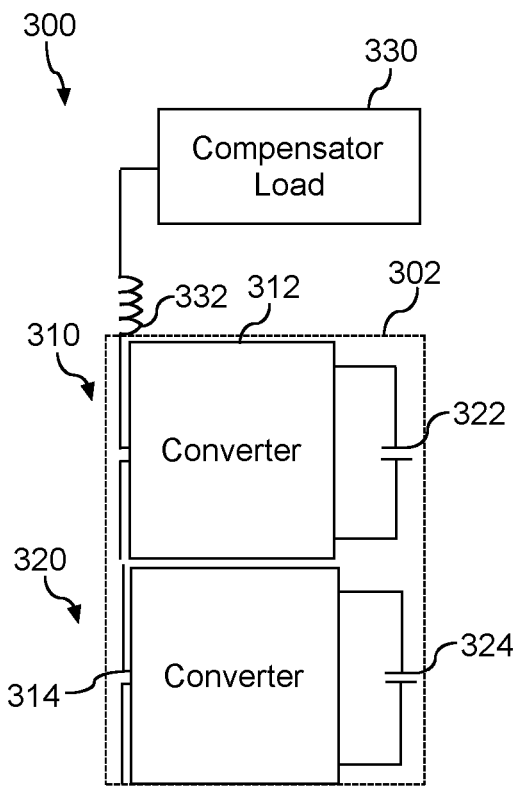
FIG. 3 depicts an example compensated system according to example aspects of the present disclosure.

FIG. 3 depicts an example system 300 including a compensator circuit 302 having a first cell 310 and a second cell 320. For instance, first cell 310 can include first converter 312 and first DC link capacitor 322. Similarly, second cell 320 can include second converter 314 and second DC link capacitor 324. Each of first cell 310 and second cell 320 can function similarly to compensator circuit 100 of FIG. 1. For instance, first cell 310 and/or second cell 320 can include additional components such as, but not limited to, a filter (e.g., a low pass filter), a battery, a controller, and/or a bypass switch. In some embodiments, a controller and/or a bypass switch can be common to both first cell 310 and second cell 320. In some embodiments, a separate controller and/or bypass switch can be provided for each cell 310, 320. In some embodiments, cell 310 and cell 320 can have differing configurations. For example, in some embodiments, switching elements in converter 312 can include silicon MOSFETs and switching elements in converter 314 can include silicon carbide MOSFETs. As one example, this can allow for cells 310, 320 to be configured for different voltage levels (e.g., a higher voltage versus a lower voltage).

Compensator circuit 302 can be coupled to compensator load 330. For example, in some embodiments, compensator load 330 can include a transformer, such as a transformer neutral and/or a transformer branch or node. In some embodiments, compensator circuit 302 can be coupled between compensator load 330 and ground (e.g., in series with a ground connection of compensator load 330). As another example, compensator circuit can be coupled in shunt with compensator load 330. For example, a first terminal of first cell 310 can be coupled to compensator load 330, and a second terminal of second cell 320 can be coupled to either a ground connection or additionally coupled to compensator load 330.

As discussed herein, compensator circuit 302 can provide a compensating signal to counteract a DC signal component at compensator load 330. As one example, the compensator circuit 302 can adjust a voltage at the compensator load (e.g., at the ground of the compensator load) to counteract the DC signal component. In some embodiments, the compensator circuit 302 can adjust the voltage directly. As another example, the compensator circuit 302 can induce a current through reactor 332 to indirectly induce a voltage across reactor 332 to counteract the DC signal component. For example, a controller can operate switching elements in converter 312 and/or converter 314 to induce the current through reactor 332.

Figure 4:
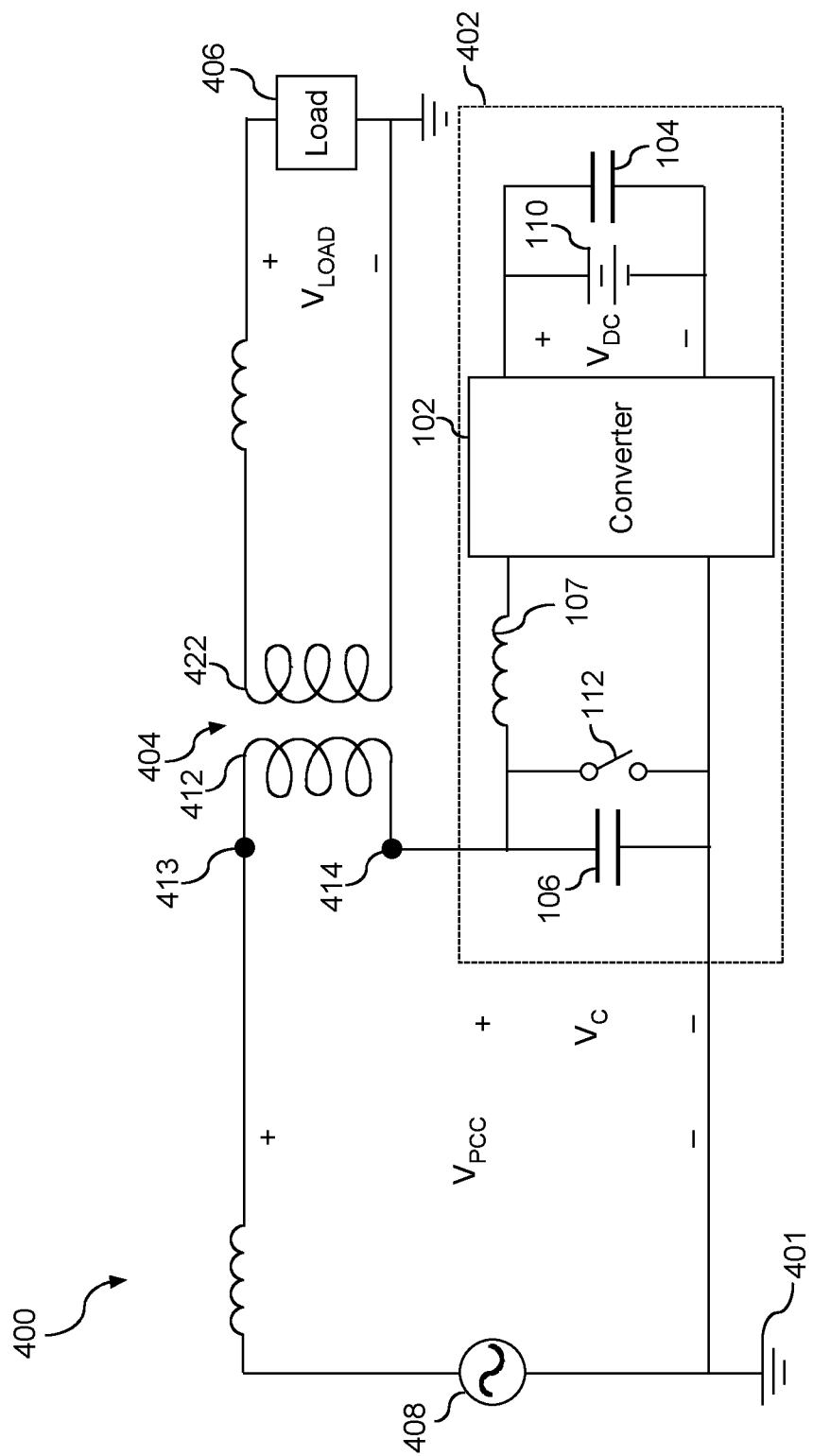
FIG. 4 depicts an example compensated transformer system according to example aspects of the present disclosure.

FIG. 4 depicts an example compensated transformer system 400 according to example aspects of the present disclosure. Compensated transformer system 400 can include compensator 402. Compensator 402 can include components discussed more particularly with reference to FIG. 1, such as, for example, converter 102, DC link capacitor 104, filter capacitor 106, filter inductor 107, battery 110, and/or bypass switch 112. Additionally, some components, such as controller 108, are omitted from FIG. 4 for purposes of illustration but can nonetheless be included in compensator 402 along with any suitable associated functions discussed with respect thereto.

Compensated transformer system 400 can include transformer 404. For example, transformer 404 can be configured to transform a signal, such as a voltage, from source 408 for system load 406. For example, source 408 can be configured to generate a signal, such as AC current and/or voltage, to be provided to transformer 404. The transformer 404 can transform the signal, such as an AC current and/or voltage, to, for example, reduce and/or increase the voltage and/or the current for system load 406. For example, in some embodiments, source 408 can be or can include a power generation system. Additionally and/or alternatively, system load 406 can include, for example, a power substation, building, vehicle, utility, electrical device, or any other suitable system load, and/or combination thereof.

Transformer 404 can include a first side 412 coupled to source 408 and a second side 422 coupled to system load 406. For example, source 408 can be coupled to a first terminal 413 of transformer 404. In some embodiments, first side 412 can be a primary side and the second side 422 can be a secondary side. In other words, primary side 412 can have a higher associated voltage (e.g., more turns) than secondary side 422. Transformer 404 is depicted as a single-phase transformer. It should be understood by one of ordinary skill in the art that transformer 404 can represent a division of a multiphase transformer in accordance with example aspects of the present disclosure. For example, transformer 404 can represent a winding corresponding to one phase coupling of a multiphase transformer (e.g., a wye-connected side of a multiphase transformer) and/or a winding corresponding to a branch between phases (e.g., in a delta-connected side of a multiphase transformer). For example, if first side 412 is a wye-connected side, first terminal 413 can be a phase coupling and second terminal 414 can be a neutral or common terminal. As another example, if first side 412 is a delta-connected side, first terminal 413 and second terminal 414 can correspond to phase nodes and first side 412 can correspond to a phase-to-phase branch.

Compensator 402 can be coupled to transformer 404. For instance, in the example compensated transformer system 400, compensator 402 can be coupled between second terminal 414 of first side 412 and ground 401. Compensator 402 can be configured to inject compensating signals into the compensated transformer system 400 to counteract DC signals in the compensated transformer system 400. For instance, compensator 402 can be configured to adjust the compensator voltage between second terminal 414 and ground 401, denoted $V_C$, to mitigate (e.g., reduce and/or eliminate) a DC signal component at, for instance, at least transformer 404 and/or system load 406.

For example, a controller (not illustrated) of compensator 402 can be configured to measure at least one DC signal component in compensated transformer system 400. As an example, compensator 402 (e.g., the controller) can be configured to measure a point of common contact voltage, denoted $V_{PCC}$, between first terminal 413 and ground 401. As another example, compensator 402 can be configured to measure the DC link voltage (e.g., DC link voltage 109 of FIG. 1), denoted $V_{dc}$, on the DC side of converter 102. As another example, compensator 402 can be configured to measure or otherwise obtain voltage measurements of voltages across other components, such as, for example, system load 406, second side 422, source 408, or any other suitable components. Based on the measured voltage, the compensator can inject compensating signals (e.g., time-varying voltages) to counteract the DC signal component. For example, the compensator voltage $V_c$ can be adjusted to counteract a DC signal component, such as a DC current, flowing through the ground connection between transformer 404 and ground.

Figure 5:
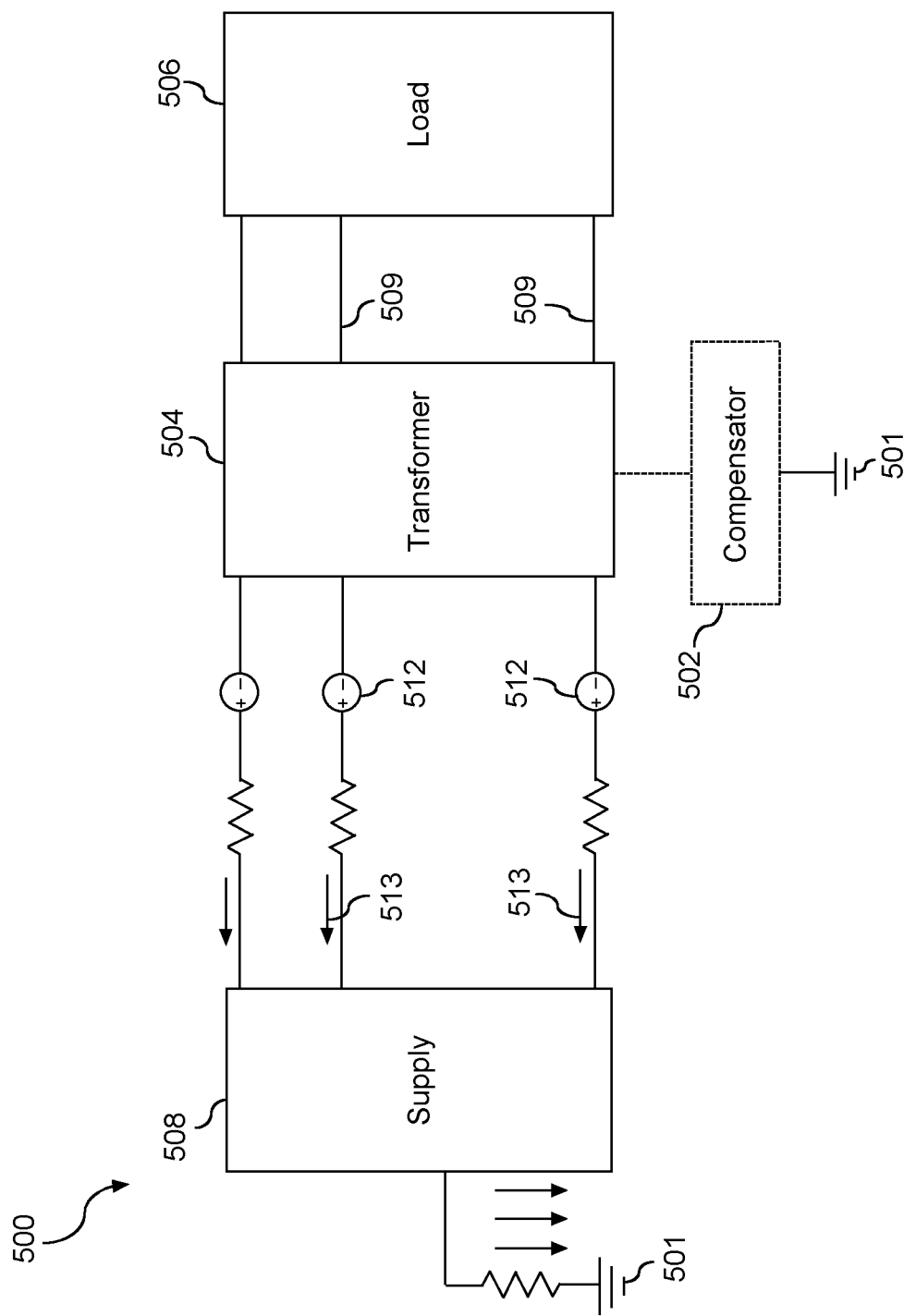
FIG. 5 depicts an example compensated three-phase transformer system according to example aspects of the present disclosure.

FIG. 5 depicts an example compensated three-phase transformer system 500 according to example aspects of the present disclosure. As illustrated, compensated three-phase transformer system 500 can include three parallel phases of transmission lines 509 coupled between three-phase supply 508, three-phase transformer 504, and/or three-phase system load 506. Each phase of compensated three-phase transformer system 500 can act similarly to the compensated transformer system 400 of FIG. 4. As illustrated in FIG. 5, DC signals (e.g., DC voltages) 512 can be induced along the transmission lines 509 in the absence of compensator 502.

For example, DC signals can be induced from a variety of factors, including geomagnetic events (e.g., GMDs, HEMPs), inverter-based generation (e.g., at supply 508), faults, or a variety of other factors, generally referred to herein as grid events. As discussed herein, DC signals 512 can induce DC currents 513 in three-phase transformer system 500. For instance, a GMD event can induce DC voltages 512 that cause a steady-state DC current 513 to flow through at least transformer 504 and that may additionally flow through load 506 and/or supply 508. For example, if transformer 504 is not grounded (e.g., to ground 501), currents 513 can flow back to supply 508, which can damage or negatively impact operation of supply 508. Similarly, currents 513 can undesirably affect and/or damage transformer 504 and/or load 506. Thus, according to example aspects of the present disclosure, compensator 502 can be coupled to transformer 504 to inject a compensating signal at transformer 504 to mitigate (e.g., reduce and/or eliminate) currents 513.

Figure 6:
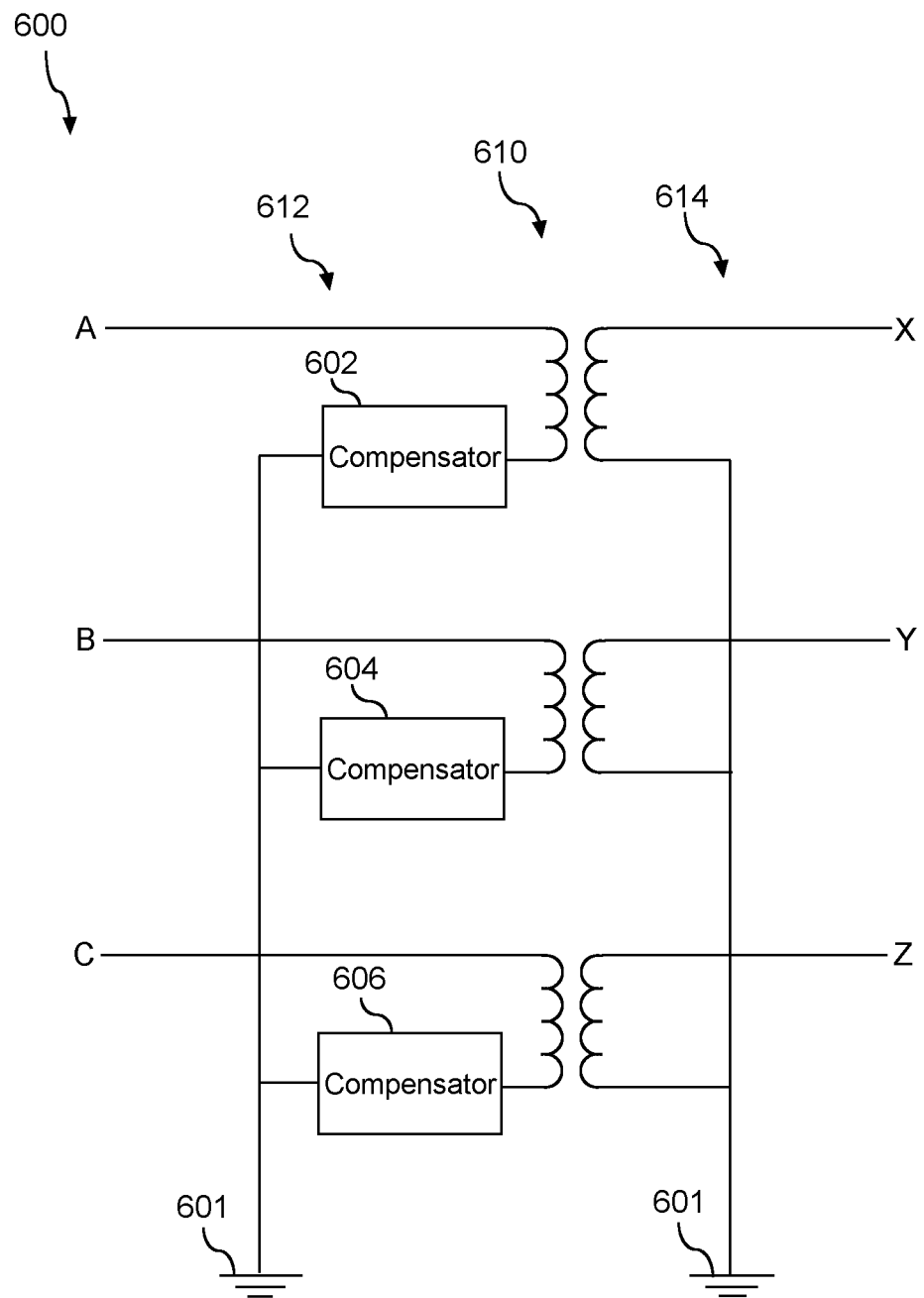
FIG. 6 depicts an example three-phase configuration of compensator circuits according to example aspects of the present disclosure.

FIG. 6 depicts an example three-phase configuration 600 of compensator circuits 602, 604, 606 according to example aspects of the present disclosure. One of ordinary skill in the art will understand that configuration 600 can be extended to a system having any suitable number of phases. Configuration 600 includes a three-phase transformer 610 including a primary side 612 having terminals labeled A, B, and C, and a secondary side 614 having terminals labeled X, Y, and Z. For example, terminals A, B, and/or C can be connected to a source, and terminals X, Y, and/or Z can be connected to a system load. Primary side 612 and secondary side 614 are wye-connected; that is, primary side 612 and secondary side 614 are each respectively coupled to a common ground 601. As illustrated, each of compensators 602, 604, 606 can be coupled between the common ground 601 and one of the windings (e.g., phase couplings) on the first side 612 of transformer 610. In this manner, each of the compensators 602, 604, 606 can inject a compensating signal for each phase of the three-phase transformer 610.

FIG. 7 depicts an example block diagram of a controller 700 for a compensator circuit according to example aspects of the present disclosure. Controller 700 can be configured to measure various signals of a system coupled to the compensator circuit (e.g., systems according to 300-600 of FIGS. 3-6). As an example, controller 700 can include control circuitry 702 configured to measure a DC link voltage, such as DC link voltage 109 of FIG. 1, denoted $V_{dc}$. Additionally, the control circuitry 702 can compare the DC link voltage to a DC link reference voltage, denoted $V_{refdc}$. In some embodiments, the compared DC link voltage can be processed by PI controller 703. Similarly, controller 700 can include control circuitry 704 configured to measure a system voltage, denoted $V_{sys}$, and/or compare the system voltage to a reference system voltage, denoted $V_{refsys}$. The system voltage can be any suitable system voltage, such as, for example, a point of common coupling voltage $V_{PCC}$ and/or a load voltage $V_{load}$. In some embodiments, the compared system voltage can be processed by PI controller 705.

Additionally, controller 700 can include control circuitry 706 configured to process the point of common coupling voltage $V_{PCC}$. For instance, phase-locked loop 707 can generate an output signal related to the phase of the point of common coupling voltage, which can be used to multiply the compared voltages from control circuitry 702 and 704 to ensure that the compared voltages are properly phase-scaled. Additionally, the fundamental of the point of common coupling voltage, denoted $V_{fundamental}$, can be isolated by lowpass filter 708. This can be subtracted from the point of common coupling voltage to compute harmonic isolated voltage, denoted $V_h$.

Additionally, controller 700 can include control circuity 710 configured to compute a compensator reference voltage, denoted $V_{ref}$. For example, the compensator reference voltage can be generally related to a desired value of the compensating signal injected by the compensator. For instance, the controller 700 can include control circuitry 712 configured to compare the current compensator voltage, denoted $V_c$, to the reference compensator voltage. The compared voltage from control circuitry 712 can be processed by PI controller 713 and then provided to pulse width modulator 714. Pulse width modulator 714 can determine control signals, denoted $S_1$-$S_4$, for each of the switching devices (e.g., 4 switching devices in the example of FIG. 7) in a converter circuit. The controller 700 can then provide the control signals to converter to control the switching devices and produce the compensating signal.

Figure 8:
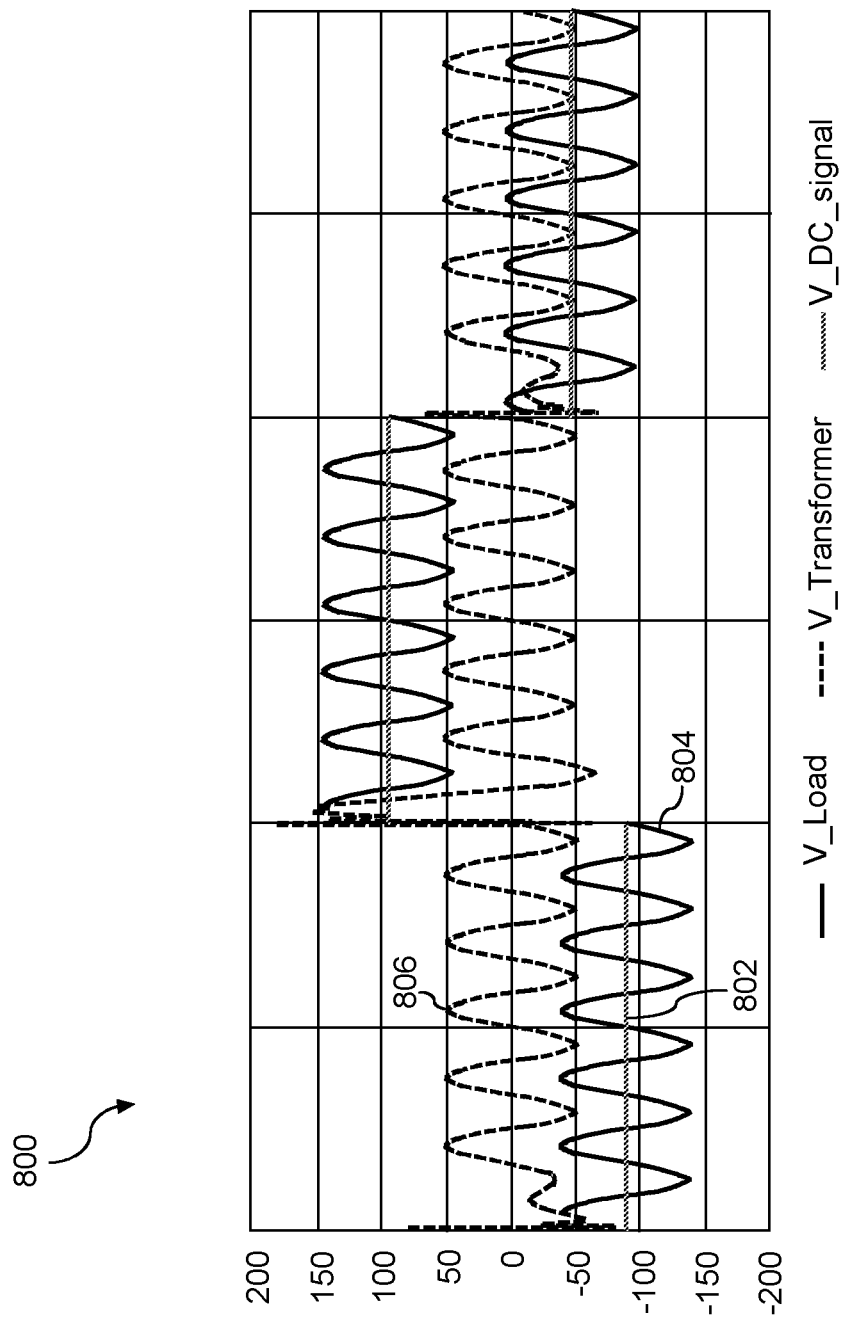
FIG. 8 depicts a voltage plot for an example grid condition at a system load and a transformer with an attached compensator circuit according to example aspects of the present disclosure.

FIG. 8 depicts a voltage plot 800 for an example grid condition at a system load and a transformer with an attached compensator circuit according to example aspects of the present disclosure. For example, FIG. 8 can depict a voltage plot for any of the systems according to 300, 400, 500, 600 of any of FIGS. 3-6. As illustrated, FIG. 8 depicts a DC signal component curve 802. For example, DC signal component curve 802 can be associated with a GMD or HEMP event. Additionally, FIG. 8 depicts a system load voltage curve 804. For instance, system load voltage curve 804 can correspond to the sum of the DC signal component curve 802 and a normal system load voltage, such as a grid voltage. For instance, the normal system load voltage can be an AC voltage. Additionally, FIG. 8 depicts a transformer voltage curve 806. For example, transformer voltage curve 806 can correspond to the voltage between a neutral and a phase node of a transformer. As illustrated, a compensator can mitigate the effect of DC signal component illustrated by DC signal component curve 802 within about a cycle of the system load voltage curve 804. This behavior can be improved even further in practical cases where generally the signal component curve 802 changes gradually, without large jumps as in the signal component curve 802 depicted in FIG. 8.

Figure 9:
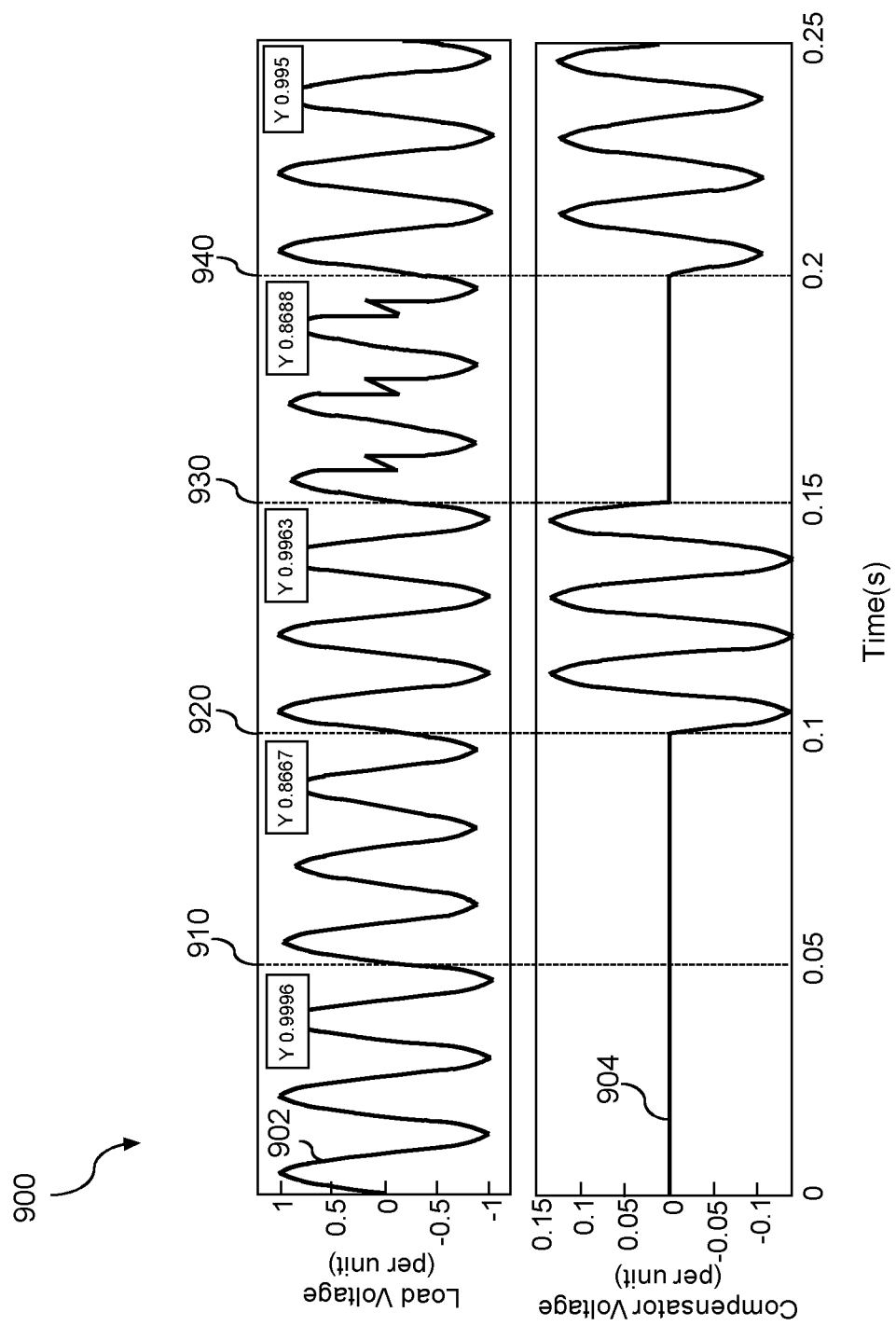
FIG. 9 depicts a voltage plot for an example compensator circuit load and compensator circuit according to example aspects of the present disclosure.

FIG. 9 depicts a voltage plot 900 for an example compensator circuit load and compensator circuit according to example aspects of the present disclosure. For example, FIG. 9 can depict a voltage plot for any of the systems according to 300, 400, 500, 600 of any of FIGS. 3-6. Voltage plot 900 depicts time-corresponding plots of load voltage curve 902 (e.g., across transformer windings) and compensator voltage curve 904 (e.g., a voltage signal output by a compensator). As illustrated, prior to time 910, load voltage curve 902 has a sinusoidal AC value between about −1 and about 1, per unit. At time 910, a voltage sag condition is applied to the load voltage. For instance, as illustrated in FIG. 9, the load voltage curve 902 has a maximum per-unit amplitude of about 0.867 relative to the original amplitude. At time 920, a compensator according to example aspects of the present disclosure is enabled. As illustrated in FIG. 9, compensator voltage curve 904 depicts a compensating signal to correct the load voltage curve 902. After time 920, the load voltage curve 902 returns to a per-unit amplitude of about 1. At time 930, the compensation is deactivated and a combination of a voltage sag condition and a DC signal component (e.g., a DC current and/or voltage present in the system) is introduced. As illustrated, after time 930, the load voltage curve 902 depicts a distorted sinusoidal waveform.

At time 940, compensation is enabled, and the load voltage curve 902 returns to a sinusoidal waveform with a per-unit amplitude of about 1.

Figure 10A:
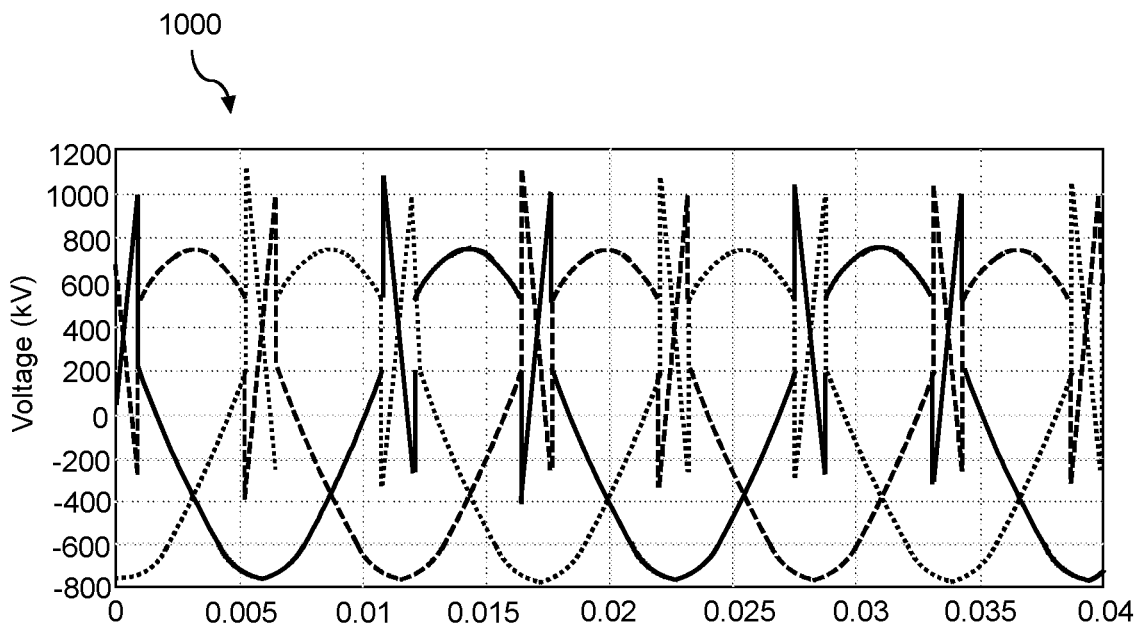
FIG. 10A depicts a voltage plot of an example three-phase transformer voltage during an example grid condition according to example aspects of the present disclosure.
Figure 10B:
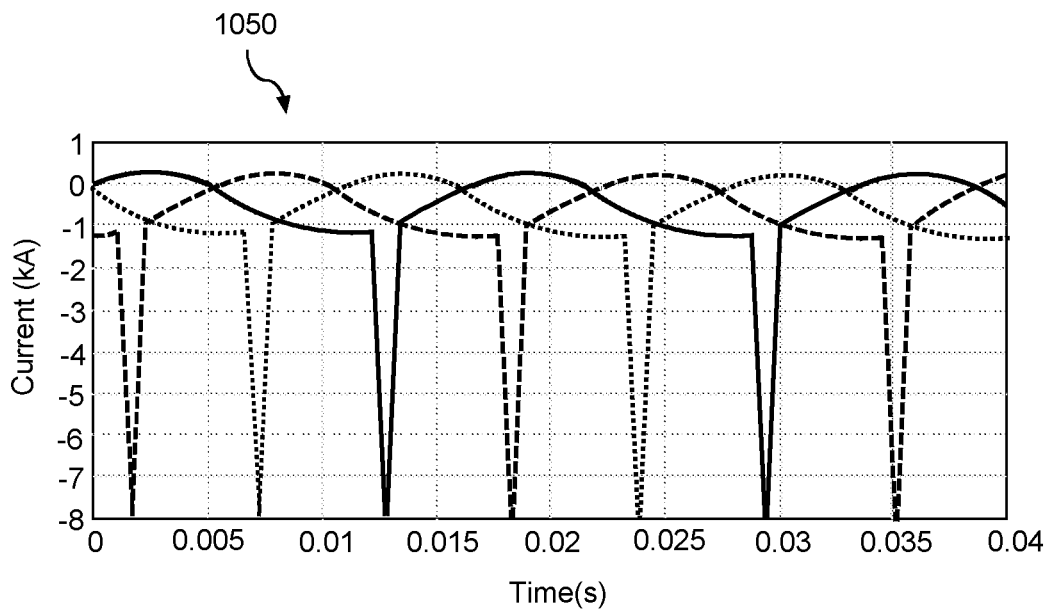
FIG. 10B depicts a current plot of an example three-phase transformer current during an example grid condition according to example aspects of the present disclosure.

FIGS. 10A and 10B depict an example voltage plot 1000 and current plot 1050, respectively, for an example three-phase power system including one or more DC signal components corresponding to GICs. For example, FIGS. 10A and 10B can depict plots for a three-phase power system such as system 500 or 600 of FIGS. 5 and 6. Generally, it is desirable that plots 1000 and 1050 resemble sinusoidal waveforms. As illustrated in plots 1000 and 1050, the DC signal component(s) have distorted the voltage and current signals such that they do not resemble sinusoidal waveforms.

Figure 11A:
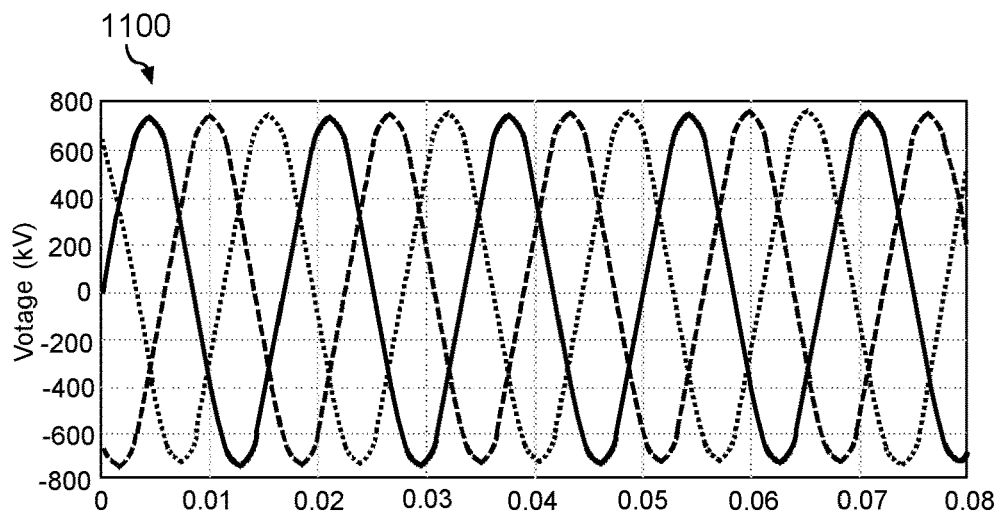
FIG. 11A depicts a voltage plot of an example three-phase transformer voltage during an example grid condition with compensation from a compensator circuit according to example aspects of the present disclosure.
Figure 11B:
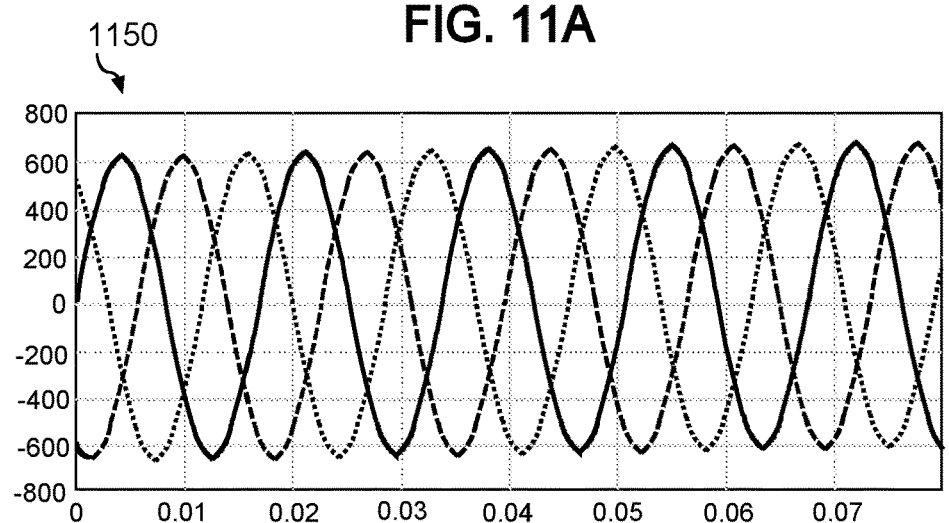
FIG. 11B depicts a current plot of an example three-phase transformer current during an example grid condition with compensation from a compensator circuit according to example aspects of the present disclosure.
Figure 11C:
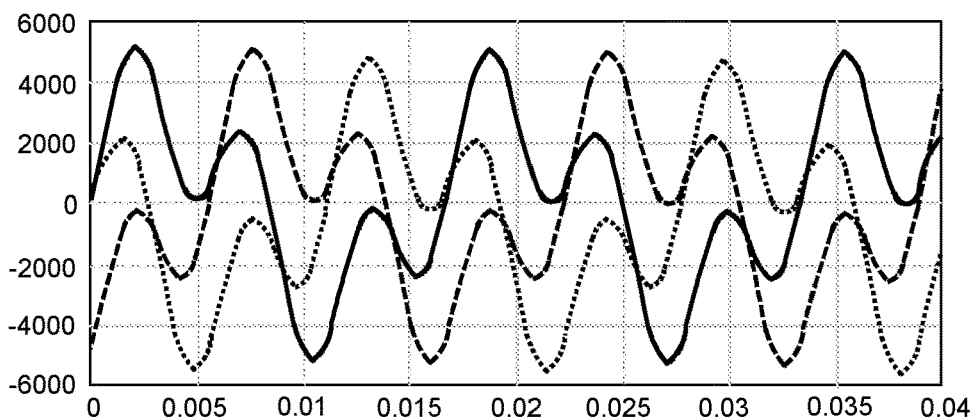
FIG. 11C depicts a voltage plot of contributions from an example compensator circuit according to example aspects of the present disclosure.

FIGS. 11A-11C depict an example compensated voltage plot 1100 and compensated current plot 1150 along with a compensating signal plot 1180, respectively. For example, compensated voltage plot 1100 and compensated current plot 1150 can respectively correspond to voltage plot 1000 and current plot 1050 of FIG. 10 after the compensating signals depicted in compensating signal plot 1180 are applied to the three-phase power system. For example, the compensating signals depicted in compensating signal plot 1180 can be applied to each phase of a three-phase transformer. As illustrated in plots 1100 and 1150, the signals generally resemble a sinusoidal signal after the compensation signals are applied.

Figure 12A:
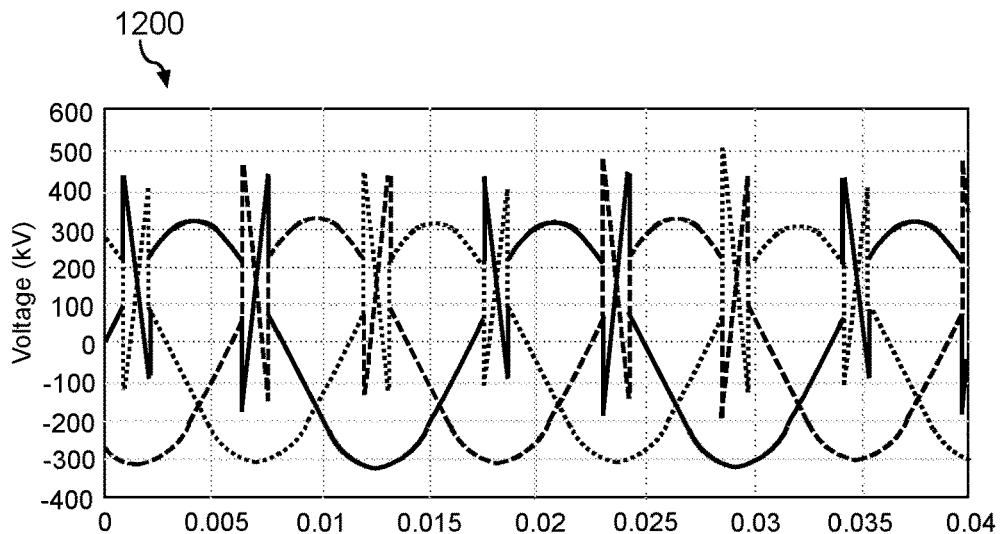
FIG. 12A depicts a voltage plot of a transformer during an example grid condition including geomagnetically induced currents, reduced system load voltage, and voltage unbalance without compensation from a compensator circuit.
Figure 12B:
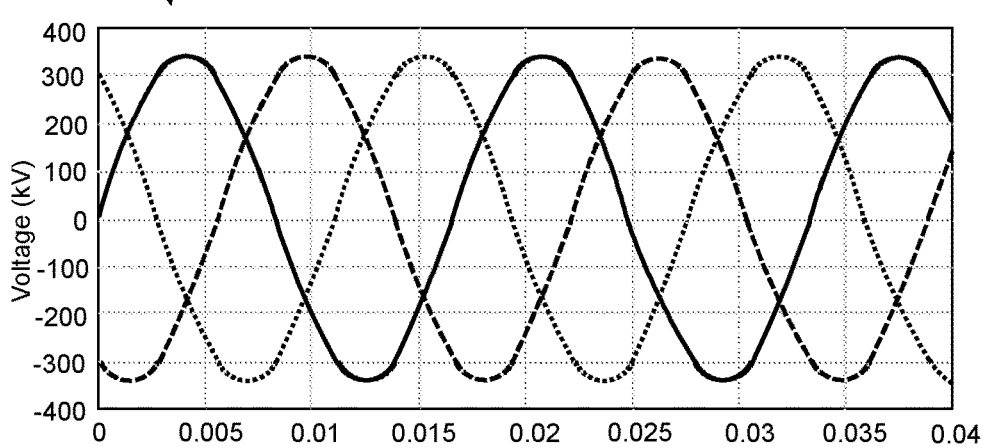
FIG. 12B depicts a voltage plot of a transformer during an example grid condition including geomagnetically induced currents, reduced system load voltage, and voltage unbalance with compensation from a compensator circuit.
Figure 12C:
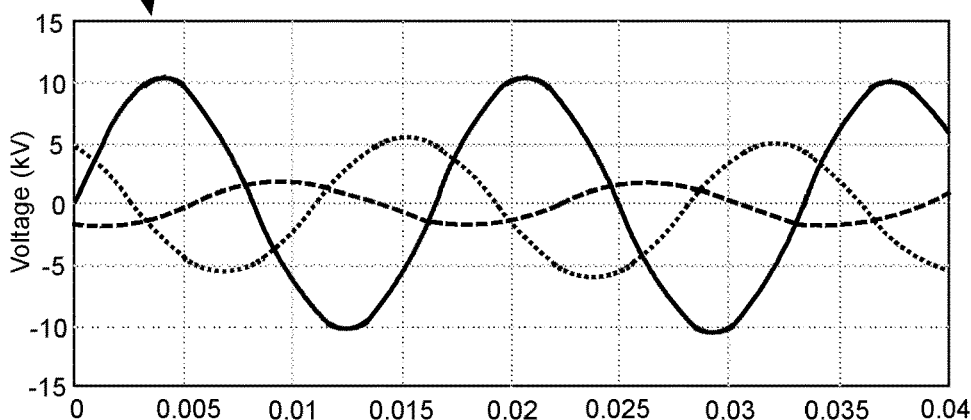
FIG. 12C depicts a voltage plot of contributions from an example compensator circuit according to example aspects of the present disclosure.

FIGS. 12A-12C depict an example grid condition voltage plot 1200 and compensated voltage plot 1250 along with a compensating signal plot 1280, respectively. For example, FIGS. 12A-12C can depict plots for a three-phase power system such as system 500 or 600 of FIGS. 5 and 6. Voltage plot 1200 can depict voltage signals in a three-phase power system under grid events including GICs, reduced load voltage, and voltage unbalance. Compensated voltage plot 1250 can depict voltage signals in the three-phase power system after the compensating signals depicted in compensating signal plot 1280 are applied to the three-phase power system. For example, the compensating signals depicted in compensating signal plot 1280 can be applied to each phase of a three-phase transformer. As illustrated in plots 1200 and 1250, the voltage signals in plot 1250 generally resemble a sinusoidal signal after the compensation signals are applied.

Figure 13:
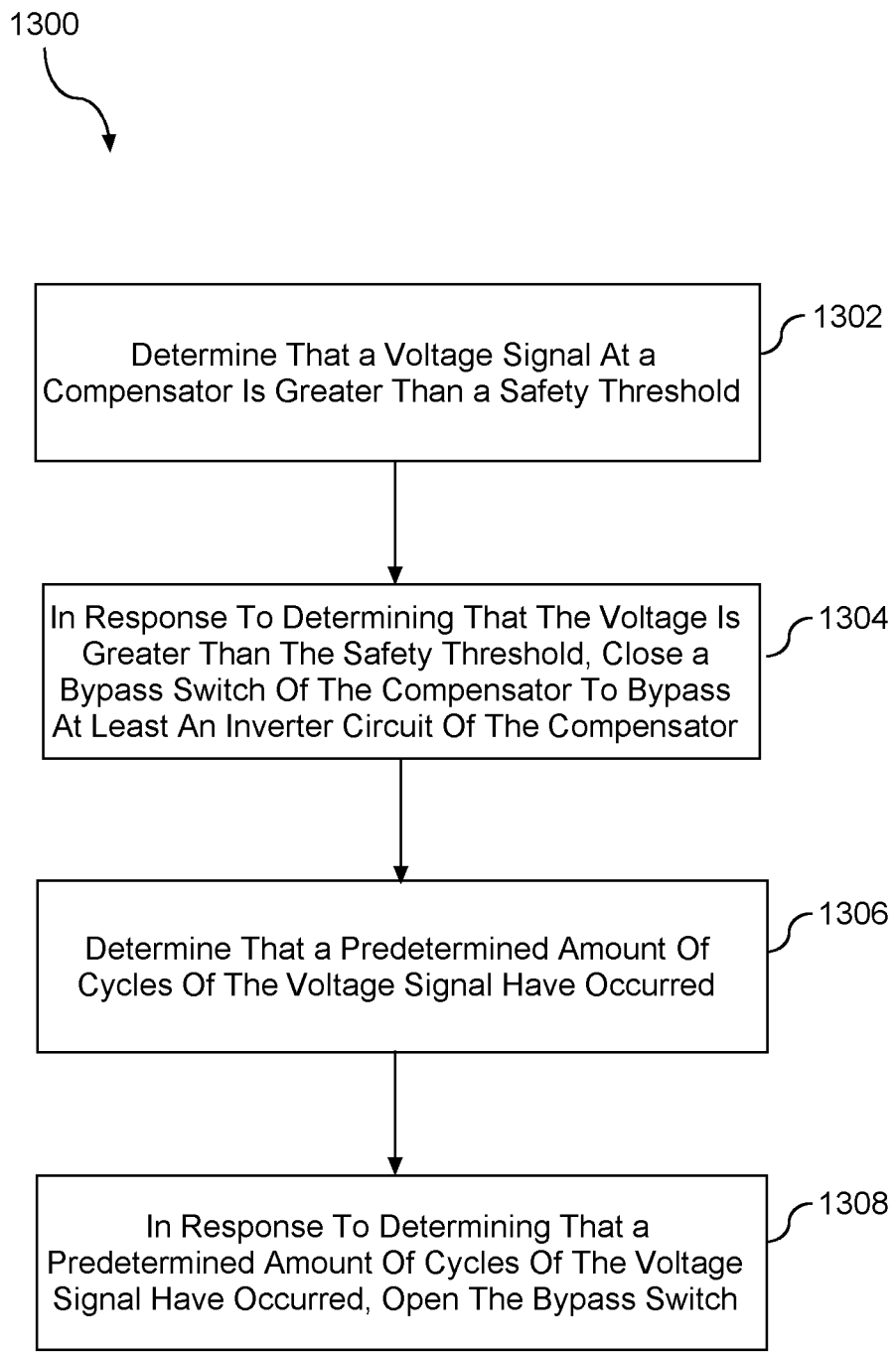
FIG. 13 depicts a flow diagram of an example method for operating an example controller of a compensator circuit to prevent damage to the compensator circuit.

FIG. 13 depicts an example method 1300 for operating an example controller of a compensator circuit to prevent damage to the compensator circuit. For example, controllers operating according to the method 1300 can selectively bypass components of the compensator circuit, such as a converter circuit, to prevent damage to the compensator circuit in overvoltage conditions, overcurrent conditions, etc. (e.g., in a fault condition).

The method 1300 can include, at 1302, determining that a compensator voltage defined across the compensator (e.g., across inputs to the compensator) is greater than a safety threshold. For example, the safety threshold can be predefined, calculated based on tolerances of the compensator and/or other circuit components, or determined in any other suitable manner. In some embodiments, the safety threshold can be or include about 1500 volts. As one example, the compensator voltage being greater than a safety threshold can be indicative of a fault condition.

The method 1300 can include, at 1304, in response to determining that the voltage is greater than the safety threshold, closing a bypass switch of the compensator to bypass at least a converter circuit of the compensator. For example, the bypass switch can short the converter circuit such that no or almost no current flows through the converter circuit.

The method 1300 can include, at 1306, determining that a predestined amount of cycles of the voltage signal have occurred. For example, in some cases, determining that a predetermined amount of cycles of the voltage signal can include waiting for a period of time corresponding to the predetermined amount of cycles, based on a known frequency of cycles in the voltage signal. In some embodiments, determining that a predetermined amount of cycles of the voltage signal have occurred can include monitoring the voltage signal to detect the predetermined amount of cycles. In some embodiments, the predetermined amount of cycles can correspond to a number of cycles to allow a fault to safely pass. For example, in some embodiments, the predetermined amount of cycles can be 20 cycles.

The method 1300 can include, at 1308, in response to determining that a predetermined amount of cycles of the voltage signal have occurred, opening the bypass switch. For example, the bypass switch can be opened to allow the converter circuit and/or other components of the compensator to resume function.

Figure 14:
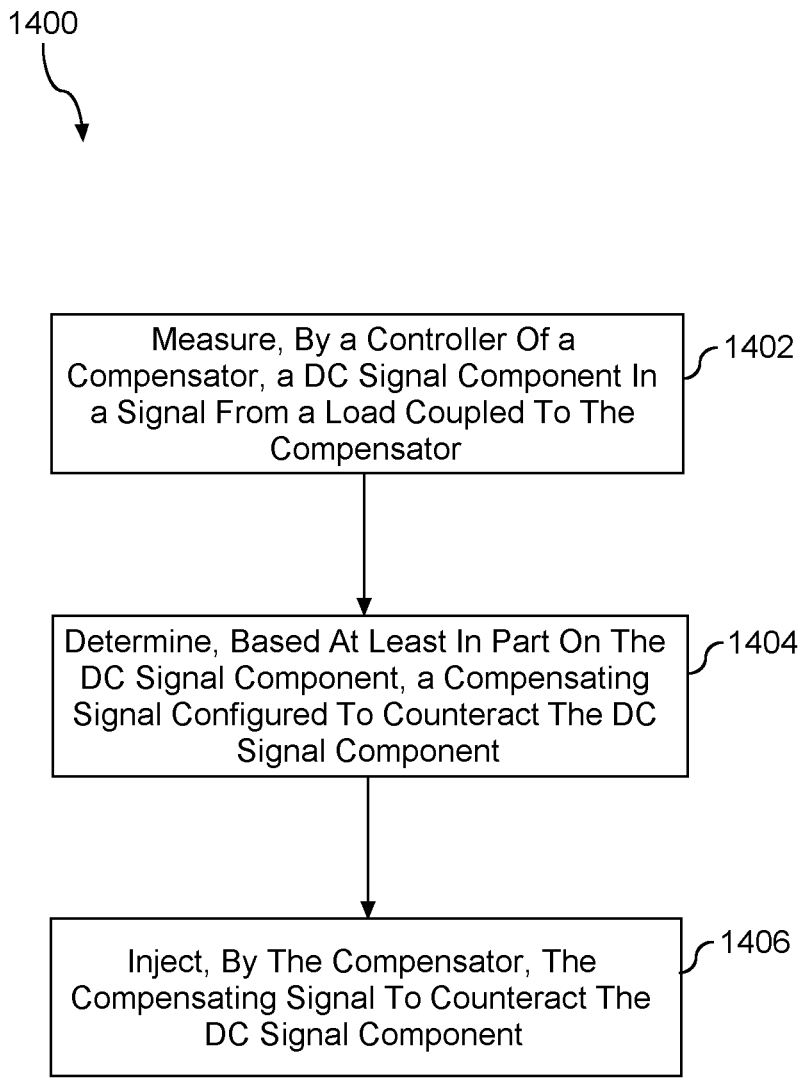
FIG. 14 depicts a flow diagram of an example method for operating a compensator circuit.

FIG. 14 depicts a flow diagram of an example method for operating a compensator circuit according to example aspects of the present disclosure. The method 1400 can include, at 1402, measuring, by a controller (e.g., the controller 700 of FIG. 7) of a compensator, a DC signal component in a signal from a compensator load coupled to the compensator. For example, in some embodiments, the compensator can be coupled to a transformer, such as a neutral of a transformer. A signal at the transformer (e.g., an AC signal) can include the DC signal component.

The method 1400 can include, at 1404, determining, based at least in part on the DC signal component, a compensating signal configured to counteract the DC signal component. For example, the controller can process the DC signal component to determine control signals required to produce the compensating signal (e.g., by a converter circuit, such as an inverter).

The method 1400 can include, at 1406, injecting, by the compensator, the compensating signal to counteract the DC signal component. For example, the controller can implement the control signals required to produce the compensating signal such that the compensating signal is injected at the compensator load. As one example, the controller can modulate switching elements in a converter circuit to produce a compensating voltage and/or current signal to counteract the DC signal component. For instance, the compensator can inject the compensating signal to provide voltage regulation, unbalance removal, and harmonic isolation for a compensator load and/or a system load and oppose one or more GIC currents in the power transmission system during a geomagnetic disturbance event.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A compensator circuit coupled between a load and ground and configured to counteract a DC signal component of an AC signal at the load, the compensator circuit comprising:
   one or more cells, each of the one or more cells comprising:
      a converter circuit comprising one or more switching elements, an AC side, and a DC side and configured to convert a DC voltage on the DC side to an AC signal at the AC side; and
      a DC link comprising at least a capacitor coupled to the DC side of the converter circuit, the DC voltage defined across the DC link; and
   a controller configured to:
      measure a DC signal component between the load and the ground;
      determine, based at least in part on the DC signal component, a compensating signal configured to counteract the DC signal component; and
      inject, by the converter circuit, the compensating signal to counteract the DC signal component such that the DC signal component is reduced.

2. The compensator circuit of claim 1, wherein each of the one or more cells further comprises a low pass filter coupled to the converter circuit, the low pass filter configured to reduce at least one switching harmonic in the AC signal from the converter circuit.

3. The compensator circuit of claim 1, wherein each of the one or more cells further comprises a battery coupled to the DC link.

4. The compensator circuit of claim 1, further comprising a bypass switch across at least one of the one or more cells and configured to selectively bypass at least the converter circuit of the at least one of the one or more cells, wherein the controller is configured to close the bypass switch to bypass at least the converter circuit in response to identifying, by the controller, a fault condition.

5. The compensator circuit of claim 4, wherein identifying, by the controller, a fault condition comprises comparing a compensator voltage across the compensator circuit to a safety threshold, wherein the fault condition comprises the compensator voltage being greater than the safety threshold.

6. The compensator circuit of claim 5, wherein the controller is further configured to open the bypass switch to allow the compensator to resume function after a predetermined amount of cycles of the compensator voltage have occurred.

7. The compensator circuit of claim 1, wherein the converter circuit comprises an H-bridge configuration of switching devices.

8. The compensator circuit of claim 1, wherein the one or more switching elements comprises at least one of one or more silicon transistors or one or more silicon carbide transistors.

9. The compensator circuit of claim 8, wherein the one or more switching elements of at least one cell of the one or more cells comprises at least one of one or more Si transistors or one or more SiC transistors.

10. The compensator circuit of claim 1, wherein the compensator circuit is a transformerless compensator circuit.

11. The compensator circuit of claim 1, wherein the converter circuit comprises a single-phase converter.

12. A power transmission system, comprising:
   a power transmission line coupled to a transformer and a system load;
   one or more compensator circuits each coupled between a node of the transformer and a ground connection, the one or more compensator circuits each configured to counteract a DC signal component of an AC signal at the transformer, wherein each of the one or more compensator circuits comprises:
      one or more cells, each of the one or more cells comprising:
         a converter circuit comprising one or more switching elements, an AC side, and a DC side, and configured to convert a DC voltage on the DC side to an AC signal at the AC side; and
         a DC link comprising at least a capacitor coupled to the DC side of the converter circuit, the DC voltage defined across the DC link; and
      a controller configured to:
         measure the DC signal component at the transformer;
         determine, based at least in part on the DC signal component, a compensating signal configured to counteract the DC signal component; and
         inject, by the converter circuit, the compensating signal to counteract the DC signal component;
   wherein a first compensator circuit of the one or more compensator circuits is coupled to a primary side of the transformer.

13. The power transmission system of claim 12, wherein the one or more compensator circuits are coupled in series with the transformer.

14. The power transmission system of claim 12, wherein at least one second compensator circuit of the one or more compensator circuits is coupled to a secondary side of the transformer.

15. The power transmission system of claim 12, wherein the transformer comprises at least one of an autotransformer or a generation step up transformer.

16. The power transmission system of claim 12, wherein the transformer comprises a multiphase transformer and wherein a compensator circuit of the one or more compensator circuits is coupled to each of a plurality of phase couplings of the multiphase transformer.

17. The power transmission system of claim 16, wherein each of the one or more compensator circuits is coupled between one of the pluralities of phase couplings and the ground connection, wherein the ground connection is common to each of the one or more compensator circuits.

18. The power transmission system of claim 16, wherein the transformer comprises at least one wye-connected side, wherein the one or more compensator circuits are coupled to a phase coupling of the plurality of phase couplings and of the wye-connected side.

19. The power transmission system of claim 12, wherein the one or more compensator circuits are configured to inject the compensating signal to provide voltage regulation, unbalance removal, and harmonic isolation for the system load and to oppose one or more GIC currents in the power transmission system during a geomagnetic disturbance event.

20. A compensator circuit coupled between a load and ground and configured to counteract a DC signal component of an AC signal at the load, the compensator circuit comprising:
one or more cells, each of the one or more cells comprising:
a converter circuit comprising one or more switching elements, an AC side, and a DC side and configured to convert a DC voltage on the DC side to an AC signal at the AC side; and
a DC link comprising at least a capacitor coupled to the DC side of the converter circuit, the DC voltage defined across the DC link; and
a controller configured to:
measure a DC signal component between the load and the ground;
determine, based at least in part on the DC signal component, a compensating signal configured to counteract the DC signal component; and
inject, by the converter circuit, the compensating signal to counteract the DC signal component
further comprising a bypass switch across at least one of the one or more cells and configured to selectively bypass at least the converter circuit of the at least one of the one or more cells, wherein the controller is configured to close the bypass switch to bypass at least the converter circuit in response to identifying, by the controller, a fault condition, wherein identifying, by the controller, a fault condition comprises comparing a compensator voltage across the compensator circuit to a safety threshold, wherein the fault condition comprises the compensator voltage being greater than the safety threshold;
wherein the controller is further configured to open the bypass switch to allow the compensator to resume function after a predetermined amount of cycles of the compensator voltage have occurred.

* * * * *